United States Patent [19]

Wilkinson

[11] Patent Number: 4,577,241
[45] Date of Patent: Mar. 18, 1986

[54] DIGITAL VIDEO TAPE RECORDER APPARATUS

[75] Inventor: James H. Wilkinson, Basingstoke, United Kingdom

[73] Assignee: Sony Corporation, Tokyo, Japan

[21] Appl. No.: 591,871

[22] Filed: Mar. 21, 1984

[30] Foreign Application Priority Data

Apr. 12, 1983 [GB] United Kingdom ................. 8309815

[51] Int. Cl.⁴ .............................................. G11B 5/09
[52] U.S. Cl. ....................................... 360/51; 375/81
[58] Field of Search .......................... 360/51; 307/511; 375/81, 120; 331/48, 50

[56] References Cited

U.S. PATENT DOCUMENTS 3,900,890 8/1975 Eibner .................................... 360/51
4,231,071 10/1980 Anderson .............................. 360/51

Primary Examiner—Vincent P. Canney
Attorney, Agent, or Firm—Lewis H. Eslinger; Alvin Sinderbrand

[57] ABSTRACT

Apparatus for regenerating a clock pulse signal from a stream of data derived from a variable-speed digital video tape recorder and lacking a strong clock pulse component, comprises a first phase-locked loop circuit to which the incoming data is supplied and which includes a loop filter of relatively wide bandwidth and a first voltage controlled oscillator. The first voltage controlled oscillator supplies a regenerated clock pulse signal to a second phase-locked loop circuit which includes a loop filter of relatively narrow bandwidth and a second voltage controlled oscillator which supplies a regenerated output clock pulse signal. The first and second voltage controlled oscillators are controlled by a preset control signal derived by a preset control signal generator arrangement in dependence on the direction and speed of a magnetic tape from which the video tape recorder is reproducing the stream of data.

6 Claims, 4 Drawing Figures

DIGITAL VIDEO TAPE RECORDER APPARATUS

BACKGROUND OF THE INVENTION

1. Field of the Invention

This invention relates to digital video tape recorder apparatus, and is particularly concerned with the regeneration of a clock pulse signal from a stream of data being reproduced by a digital video tape recorder (VTR) from a magnetic tape.

2. Description of the Prior Art

Clock pulse signal recovery is a particular problem where data is being derived from a noisy source, such as off tape by a digital VTR. Because of the high sampling rate required to digitize a television signal, there is generally no spare capacity available when recording on a digital VTR to record clock information, and regeneration from the reproduced stream of data is therefore necessary.

Initially a tuned circuit was used for clock regeneration or recovery, the tuned circuit resonating at the clock frequency. However, this technique is only satisfactory in cases where the code used for recording has a strong clock component, and there is a large and reasonably continuous amount of clock information in the reproduced data; because if there is a significant gap in the reproduced clock information, the tuned circuit will cease to resonate. In the case of digital television signals coming off tape there are substantial gaps in which there is no clock information at all. It has therefore been proposed to use a phase-locked loop (PLL) circuit arrangement.

A PLL circuit arrangement can be designed with some of the characteristics of a tuned circuit, in particular a narrow bandwidth and a strong pick-up of the required frequency, but with the additional advantage that in the temporary absence of incoming clock information the PLL circuit can effectively act as a sample-and-hold circuit, with the output continuing at a value determined by the last-received clock information.

In the case of a stream of data derived from the tape of a single-speed digital VTR, each field of the data contains a substantial amount of useful information, but for some 10% of each rotation of the magnetic head assembly of the VTR no useful data is derived because the magnetic head is not engaging the tape. The envelope of the derived data, which envelope has a frequency of 50 Hz, therefore includes some 90% with useful clock information, although even in this part of the envelope there may be significant gaps in the clock information due to drop-out on reproduction or to the characteristics of the actual picture content represented by the data. The PLL circuit has the ability to bridge any such gap and to pick-up and correct quickly to any change in the clock frequency following such a gap.

Referring to FIG. 1 of the accompanying drawings, this shows a previously-proposed PLL circuit arrangement for clock regeneration. Data derived from the tape of a single-speed digital VTR is supplied by way of an input terminal 1 to one input of an exclusive-OR gate 2, the incoming data from the input terminal 1 also being supplied by way of a delay device 3 which introduces a delay of t, to a second input of the exclusive-OR gate 2. The output of the exclusive-OR gate 2 is connected to respective inputs of AND gates 4 and 5, the outputs of which, inverted in the case of the AND gate 5, are connected to respective current pump circuits 6 and 7, the outputs of which are connected in common to a loop filter 8. The output of the loop filter 8 is a voltage which is supplied to a voltage controlled oscillator (VCO) 9 which produces a clock signal CLK and also an inverted clock signal $\overline{CLK}$, the clock frequency being controlled in dependence on the voltage supplied by the loop filter 8. The clock signal CLK and the inverted clock signal $\overline{CLK}$ are respectively supplied to second input terminals of the AND gates 4 and 5.

The operation is as follows. The exclusive-OR gate 2 and the delay device 3 together have the effect of differentiating the incoming data, and at the output of the exclusive-OR gate 2 there are produced pulses of duration t, one such pulse being produced for each edge, both positive and negative, of the incoming data. It is necessary that t be less than, or at most equal to, half the clock period of the incoming data.

If the differentiated pulses supplied by the exclusive-OR gate 2 to the AND gates 4 and 5 move in phase relation to the clock pulse signal CLK (or $\overline{CLK}$), one of the AND gates 4 or 5 will produce a wider output pulse than the other. The loop will settle, that is to say become correctly locked, when the edges of the clock pulse signal CLK (or $\overline{CLK}$) are centred in the data pulses supplied by the exclusive-OR gate 2. This part of the circuit arrangement therefore forms a phase detector, and this particular form of phase detector is sometimes called a charge pump phase detector.

The loop filter 8 largely determines the characteristics of the phase-locked loop. In a particular example of the PLL circuit arrangement of FIG. 1, the operating frequency is 50 MHz, the hold range is ±500 KHz, the capture range is 1 MHz, the loop bandwidth is 200 KHz and the accuracy of data regeneration is within ±1 nanosecond.

There is, however, a problem, and this is that if the loop filter bandwidth is too small, the PLL circuit can lock out. This occurs when the voltage supplied to the VCO 9 is at one end of the range when it should be at the other. In this case the loop filter 8 integrates the frequency difference and no error is apparent. To overcome this problem the bandwidth of the loop filter 8 must be wide, but the wider this bandwidth is made the less effective the arrangement is in reducing the noise modulation. In the case of data off the tape of a digital VTR, therefore, which data is subject to severe noise modulation, it is rather difficult to find a satisfactory compromise design for the loop filter 8 which will sufficiently reduce the noise modulation without, at the same time, causing lock out.

This difficulty is compounded in the case of a digital VTR the speed of which is to be varied on reproduction in order to achieve special effects such as fast-motion, slow-motion and stop-motion. Where the normal replay speed results in a data rate of 50 Megabits per second, the special effects may cause the data rate to change to somewhere in the range of 35 to 65 Megabits per second.

In an attempt to deal with these problems we have previously proposed in our UK patent application No. 8029485 (Ser. No. 2 084 415) a dual phase-locked loop arrangement in which selection of a special effect mode causes a pre-set control voltage to be applied to respective VCOs in the two phase-locked loops. However, this arrangement is difficult to design and does not operate wholly satisfactorily in practice, as the arrangement can still lock out.

SUMMARY OF THE INVENTION

One object of the present invention is to provide a PLL circuit arrangement in which these problems are alleviated.

Another object of the present invention is to provide a PLL circuit arrangement suitable for clock regeneration in a variable-speed digital VTR.

Another object of the present invention is to provide a PLL circuit arrangement comprising two phase-locked loop circuits including respective VCOs which are controlled by a preset control signal in dependence on the direction and speed of a magnetic tape.

According to the present invention there is provided digital video tape recorder apparatus comprising:

means operative in reproduction modes of the apparatus to derive a stream of coded data reproduced from a magnetic tape, a speed-dependent pulse signal of frequency dependent on the transport speed of said tape, and a direction signal indicating the direction of transport of said tape;

a first phase-locked loop circuit to which said stream of data is supplied and including a loop filter of relatively wide bandwidth and a first voltage controlled oscillator for producing a first regenerated clock pulse signal from said stream of data;

a second phase-locked loop circuit to which said first regenerated clock pulse signal is supplied and including a loop filter of relatively narrow bandwidth and a second voltage controlled oscillator for producing an output regenerated clock pulse signal from said first regenerated clock pulse signal and for use in regenerating said stream of data; and a preset control signal generator arrangement for deriving at least one preset control signal in dependence on said speed-dependent pulse signal and said direction signal and for supplying said at least one preset control signal to said first and second voltage controlled oscillators.

The above, and other objects, features and advantages of this invention will be apparent from the following detailed description of illustrative embodiments which is to be read in connection with the accompanying drawings.

DESCRIPTION OF THE PREFERRED EMBODIMENTS

To overcome the problems described above, embodiments of the present invention provides a dual PLL circuit arrangement which combines the characteristic of having a very wide lock range and a very narrow filter bandwidth, and voltage controlled oscillators in each PLL are preset in dependence on the tape transport speed and direction.

Figure 2:
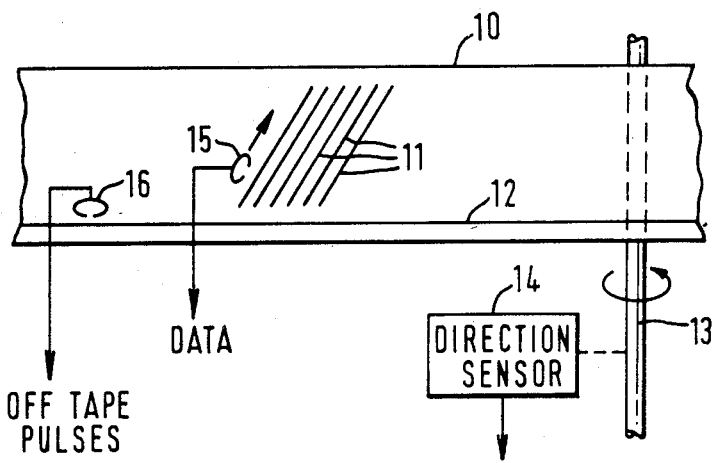
FIG. 2 shows diagrammatically the derivation of signals from and associated with a magnetic tape.
Figure 3:
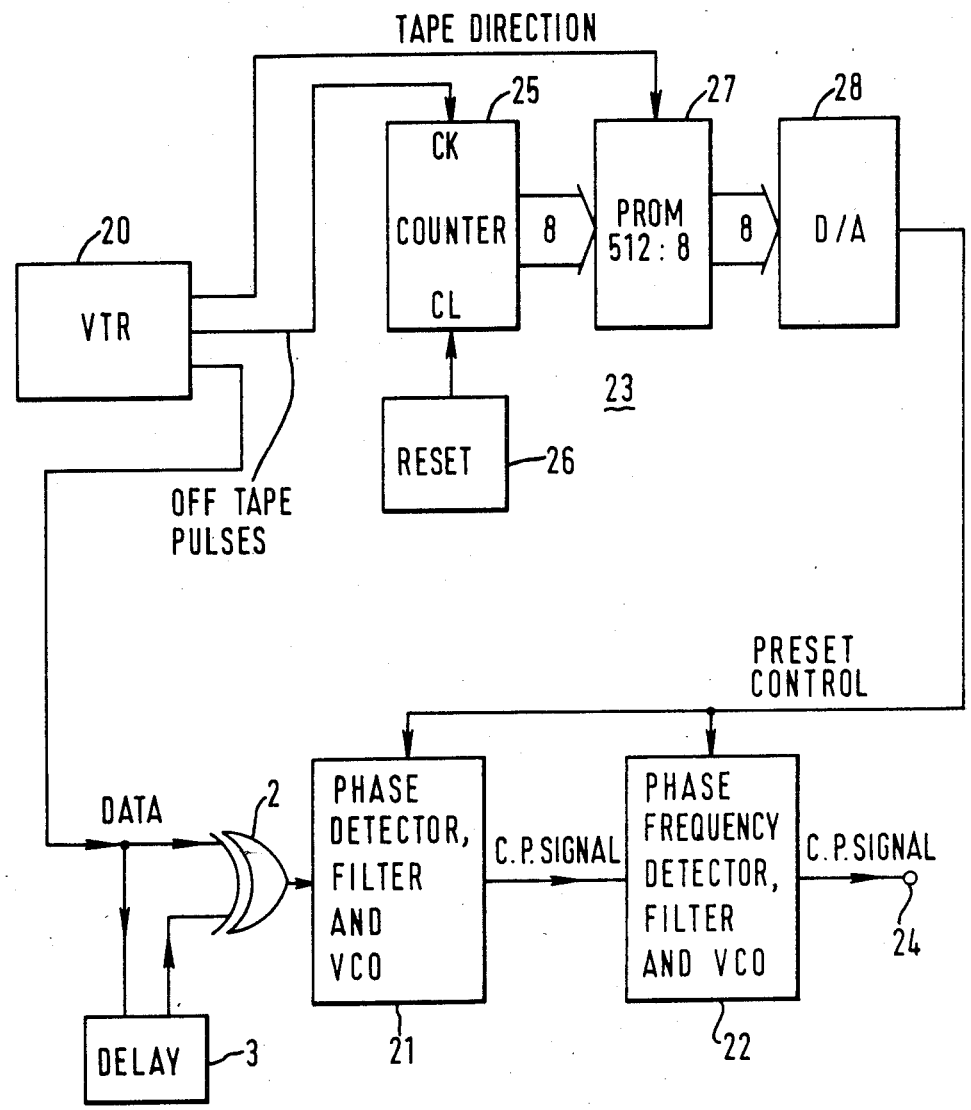
FIG. 3 shows in block form an embodiment of the invention.

Referring to FIG. 2, this shows part of a magnetic tape 10 from which data is to be reproduced by a variable-speed digital VTR 20 forming part of the embodiment of FIG. 3. Data are recorded in skew tracks 11, and constant frequency pulses are recorded in a longitudinal track 12 on the tape 10. The VTR 20 comprises a capstan 13 for transporting the tape 10 at controllable different speeds about a drum assembly (not shown). Associated with the capstan 13 is a direction sensor 14 for sensing the direction of rotation of the capstan 13 and hence the direction of transport of the tape 10. The drum assembly includes at least one rotary reproducing head 15 for reproducing the data from the skew tracks 11, and associated with the drum assembly is a fixed reproducing head 16 for reproducing the pulses from the longitudinal track 12.

The VTR 20 has various reproducing modes including in particular a so-called shuttle mode in which the speed of transport of the tape 10 can be varied over a range from a high speed in the reverse direction through zero to a high speed in the normal forward direction. By a high speed may be meant up to thirty to fifty times the normal reproducing speed. In these reproducing modes the direction sensor 14 supplies a tape direction signal indicating the direction of transport of the tape 10, the rotary head 15 supplies the reproduced data, and the fixed head supplies the off tape pulses at a frequency proportional to the tape speed.

Referring now to FIG. 3, the embodiment to be described comprises the VTR 20, a first PLL circuit arrangement 21 generally as described above with reference to FIG. 1, a second PLL circuit arrangement 22, and a preset control signal generator arrangement 23.

Figure 1:
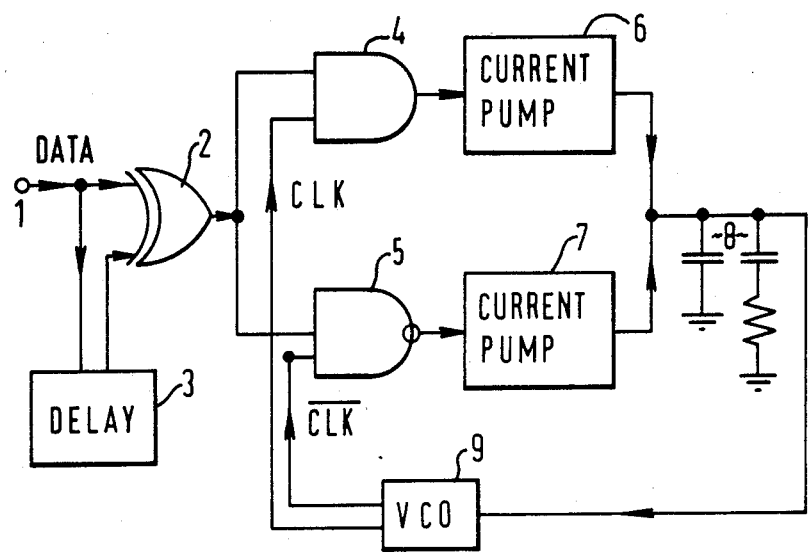
FIG. 1 shows in block form a previously proposed PLL circuit arrangement for clock recovery.

As described above, the incoming data is supplied directly and by way of the delay device 3 to repective inputs of the exclusive-OR gate 2. The output of the exclusive-OR gate 2 is connected to the remainder of the first PLL circuit arrangement 21 comprising the charge pump phase detector, the loop filter and the VCO which are generally as shown in FIG. 1 but are not shown separately in FIG. 2. The first PLL circuit arrangement 21 produces a regenerated clock pulse signal which is supplied to the input of the second PLL circuit arrangement 22. This regenerated clock pulse signal has too much jitter to be used directly for data regeneration.

The second PLL circuit arrangement 22 comprises a phase frequency detector in the form of a digital storage phase detector which can operate with a very narrow frequency bandwidth and does not suffer from lock out, that is, the capture range always equals the lock range. It cannot lock out because it is a phase and frequency detector and not merely a phase detector. Thus, if, for example, the frequency is too low, this is positively indicated. However, the PLL circuit arrangement 22 cannot be used alone, because there is insufficient clock information in the incoming data supplied to the input terminal 1.

As compared with FIG. 1, in the embodiment of FIG. 3 the first PLL circuit arrangement 21 has been modified to increase each of the capture range, the hold range and the loop bandwidth by a factor of six. The effect of this is that the regenerated clock pulse signal supplied by the first PLL circuit arrangement 21 to the second PLL circuit arrangement 22 is insufficiently filtered for direct use, but this regenerated clock pulse signal has the noisy component filtered out to the required bandwidth of 100 KHz by the second PLL circuit arrangement 22, which supplies an output filtered clock pulse signal to an output terminal 24.

Although not shown in FIG. 3, the second PLL circuit arrangement 22 comprises the phase frequency detector, a loop filter and a VCO, the latter two elements being generally similar to those shown in FIG. 1. The phase frequency detector may be generally as described in "Phase Lock Techniques" by F. M. Gardner, 2nd Edition Wiley, Page 123 or "Motorola MECL Handbook" 1978, Pages 6-72 to 6-76.

To deal with gross variation in the data rate occasioned by selection of a special reproduction mode of the VTR 20, a VCO preset control signal is supplied to the respective VCOs in the first and second PLL circuit arrangements 21 and 22 to effect coarse control of their operating frequencies. Provision of such a VCO preset control signal substantially eases the circuit design.

The preset control signal generator arrangement 23 comprises a counter 25, a reset signal generator 26, a programmable read-only memory (PROM) 27 and a digital-to-analog (D/A) converter 28. During reproduction, the VTR 20 supplies the off tape pulses derived by the fixed head 16 (FIG. 2) to the clock input of the counter 25 which is reset to zero at the end of successive regular intervals of time by a reset signal applied to the clear terminal of the counter 25. The count immediately prior to each reset operation is a speed signal which is supplied in the form of an 8-bit input to the PROM 27, which also receives the tape direction signal from the direction sensor 14 (FIG. 2) which indicates whether the preset control signal must go up or down. In dependence on these inputs the PROM 27, which is in effect operating as a linearity controller, derives an 8-bit digital preset control signal which is converted by the D/A converter 28 to the preset control signal for supply to the VCOs in the first and second PLL circuit arrangements 21 and 22. The effect is that although the first and second PLL circuit arrangements as a whole have a loop bandwidth of only a few percent of the incoming frequency so as to achieve reasonable filtering, and hence there is only a narrow capture range, this capture range can be moved up and down in dependence on the incoming data rate. The intervals at which the counter 25 is reset depend primarily on the response time of the tape transport mechanism. If the mechanism is such that the speed of the tape 10 can be changed rapidly, then the interval may be say 0.1 second, but if the mechanism is more sluggish then the interval may be say one second. The reset signal generator 26 may be any suitable reference timer or interval oscillator in the system.

The first and second PLL circuit arrangements 21 and 22 will now be further described with reference to FIG. 4. The data from the exclusive-OR gate 2 (FIG. 3) is supplied by way of an input terminal 32 to the first PLL circuit 21 which comprises a phase detector 33, a loop filter 34 having a relatively wide bandwidth and a VCO 35. The output supplied by the VCO 35 is a first regenerated clock pulse signal which is supplied to the phase detector 33 and also to a phase frequency detector 36 of the second PLL circuit 22. The second PLL circuit 22 also includes a loop filter 38 having a relatively narrow bandwidth and a VCO 39 similar to the VCO 35. The output of the VCO 39 is the required output regenerated clock pulse signal and is supplied to the phase frequency detector 36, to the output terminal 24 and also to a latch circuit 40. The stream of data supplied to the input terminal 32 is also supplied to a timing circuit 41 to effect any required delay and is then supplied to the latch circuit 40 which is latched under control of the regenerated clock pulse signal, so as to supply the required regenerated output data to an output terminal 42. An input terminal 43 is connected to the VCOs 35 and 39 for the supply thereto of the preset control signal.

Briefly, the operation is as follows. The incoming stream of data from the VTR 20 which is supplied to the input terminal 32 is deficient in clock information, and moreover may vary in data rate over a fairly substantial range, in particular when the reproducing mode of the VTR 20 is changed to achieve a special effect. The bandwidth of the loop filter 34 is however such as to ensure that the first PLL circuit 22 has a wide capture range. Despite any lack of clock information in the incoming data, therefore, the VCO 35 supplies the continuous first regenerated clock pulse signal to the second PLL circuit 22. The bandwidth of the loop filter 38 is such that the PLL circuit 22 has a relatively narrow capture range and the VCO 39 supplies the required output regenerated clock pulse signal.

Figure 4:
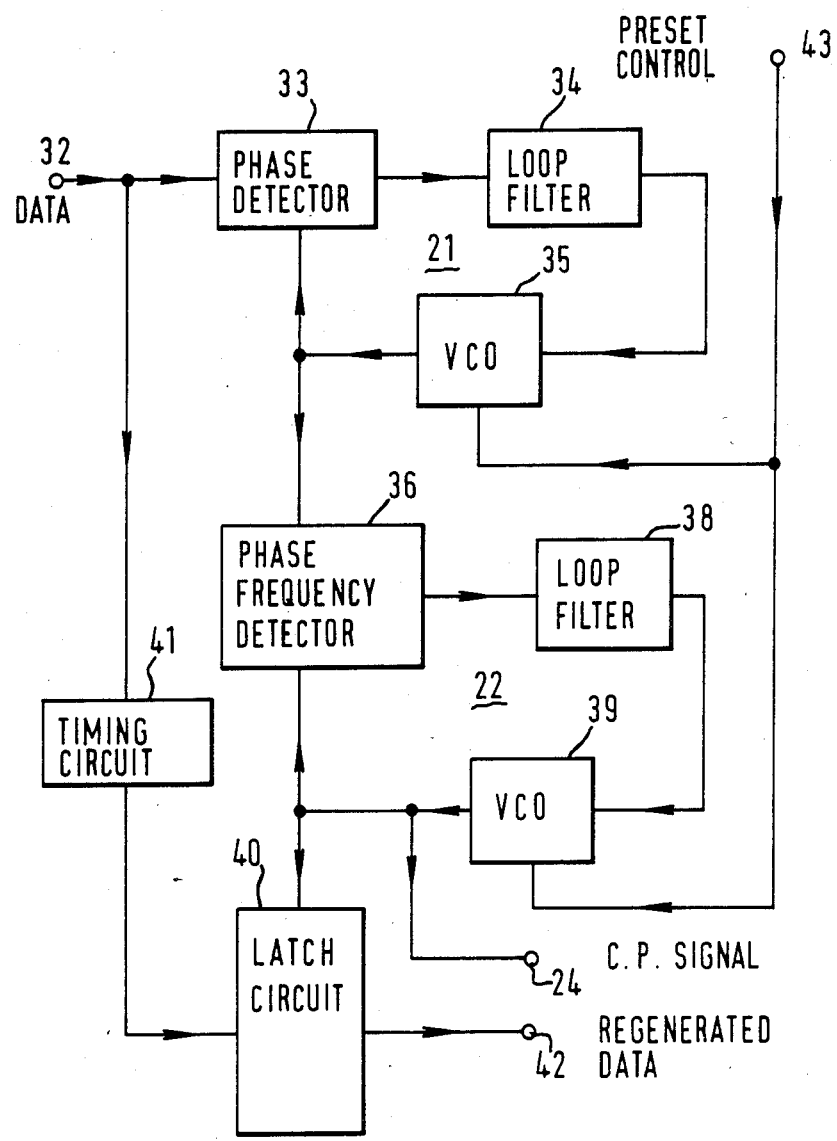
FIG. 4 shows in more detailed block form part of the embodiment of FIG. 3.

It is easy to add an error indicator to the embodiment of FIGS. 3 and 4. This requires a further latch circuit to which are supplied the incoming data and a regenerated clock pulse signal derived from the output of the second PLL circuit arrangement 22. Normally the regenerated clock pulse signal latches "0"s through the further latch circuit, but should the regenerated clock pulse signal become mistimed relative to the data, that is, be clocking the data on an edge, then the further latch circuit clocks a "1". This forms an error pulse which is used to drive a buffer circuit which broadens the pulse sufficiently to energise a visual display. If the clock regenerator fails to lock correctly for any reason the error pulses will occur frequently and the visual display will be substantially continously energised.

Various modifications are of course possible. For example, although it is convenient for the VCOs 35 and 39 in the first and second PLL circuit arrangements to be similar so that they can be controlled by the same preset control signal, this is not essential. If their control characteristics are different, then appropriate respective preset control signals can be derived for each of them by the PROM 27.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:
1. Digital video tape recorder apparatus comprising:
   means operative in reproduction modes of the apparatus to derive a stream of coded data reproduced from a magnetic tape, a speed-dependent pulse signal of frequency dependent on the transport speed of said tape, and a direction signal indicating the direction of transport of said tape;
   a first phase-locked loop circuit to which said stream of data is supplied and including a loop filter of relatively wide bandwidth and a first voltage controlled oscillator for producing a first regenerated clock pulse signal from said stream of data;
   a second phase-locked loop circuit to which said first regenerated clock pulse signal is supplied and including a loop filter of relatively narrow bandwidth and a second voltage controlled oscillator for producing an output regenerated clock pulse signal from said first regenerated clock pulse signal and for use in regenerating said stream of data; and a preset control signal generator means for deriving at least one preset control signal in dependence on said speed-dependent pulse signal and said direction signal and for supplying said at least one preset control signal to said first and second voltage controlled oscillators.

2. Apparatus according to claim 1 wherein said preset control signal generator means comprises a counter for deriving from said speed-dependent pulse signal a respective speed signal representing the distance travelled by said tape in respective successive intervals of time.

3. Apparatus according to claim 2 wherein said preset control signal generator arrangement further comprises a programmable read-only memory for deriving said at least one preset control signal in dependence on said speed signal and said direction signal.

4. Apparatus according to claim 1 wherein said first phase-locked loop circuit includes a phase detector to which said stream of data is supplied.

5. Apparatus according to claim 4 wherein said second phase-locked loop circuit includes a phase frequency detector to which said first regenerated clock pulse signal is supplied.

6. Apparatus according to claim 1 wherein said output regenerated clock pulse signal is supplied to a latch circuit to which said stream of data is also supplied, said latch circuit supplying output regenerated data.

* * * * *